(12) United States Patent
Mellott et al.

(10) Patent No.: US 8,679,327 B2
(45) Date of Patent: Mar. 25, 2014

(54) BIORETENTION BOX

(75) Inventors: Donald G. Mellott, University Place, WA (US); James B. Dort, Tacoma, WA (US); Danielle J. Santman, Kent, WA (US)

(73) Assignee: BCRA Engineering, Tacoma, WA (US)

( * ) Notice: Subject to any disclaimer, the term of this patent is extended or adjusted under 35 U.S.C. 154(b) by 202 days.

(21) Appl. No.: 13/080,090

(22) Filed: Apr. 5, 2011

(65) Prior Publication Data

US 2012/0080365 A1 Apr. 5, 2012

Related U.S. Application Data

(60) Provisional application No. 61/341,676, filed on Apr. 5, 2010.

(51) Int. Cl.
*C02F 3/32* (2006.01)
*E03F 5/04* (2006.01)
*C02F 103/00* (2006.01)

(52) U.S. Cl.
CPC .......... *C02F 3/327* (2013.01); *C02F 2103/001* (2013.01); *E03F 5/0404* (2013.01)
USPC ....... 210/150; 210/165; 210/170.03; 210/602

(58) Field of Classification Search
USPC ........... 210/150, 151, 163, 164, 165, 170.03, 210/170.08, 602
See application file for complete search history.

(56) References Cited

U.S. PATENT DOCUMENTS

| 6,149,803 | A  | * | 11/2000 | DiLoreto et al. | 210/164 |
| 6,277,274 | B1 | * | 8/2001 | Coffman | 210/150 |
| 7,112,274 | B1 | * | 9/2006 | Sanguinetti | 210/163 |
| 7,776,217 | B2 | * | 8/2010 | Lucas | 210/170.03 |
| 2007/0256966 | A1 | * | 11/2007 | Siviter et al. | 210/150 |
| 2007/0262009 | A1 | * | 11/2007 | Fitzgerald | 210/170.03 |
| 2008/0251448 | A1 | * | 10/2008 | Kent | 210/170.03 |
| 2011/0233121 | A1 | * | 9/2011 | Liu | 210/165 |
| 2013/0001158 | A1 | * | 1/2013 | Condon et al. | 210/151 |

* cited by examiner

*Primary Examiner* — Christopher Upton
(74) *Attorney, Agent, or Firm* — Jensen & Puntigam, P.S.

(57) ABSTRACT

The bioretention box includes a vault, a lid and a removable grate positioned within the lid, the combination of the vault, lid and grate being positionable with a dugout subgrade region and capable of supporting vehicular traffic within a parking area. Within the bioretention box is a treatment region to remove contaminants from storm water ingress. The treated water moves through openings in the bottom of the vault or through pipes to outside the vault, to a storm drain. The bioretention box includes overflow pipes which accommodate heavy storm water flows.

7 Claims, 2 Drawing Sheets

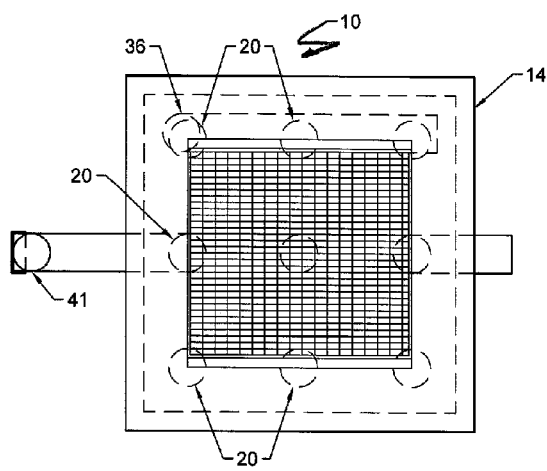
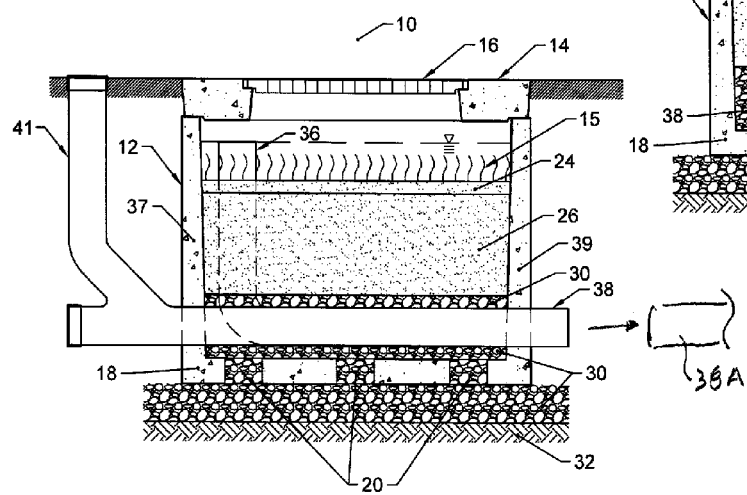
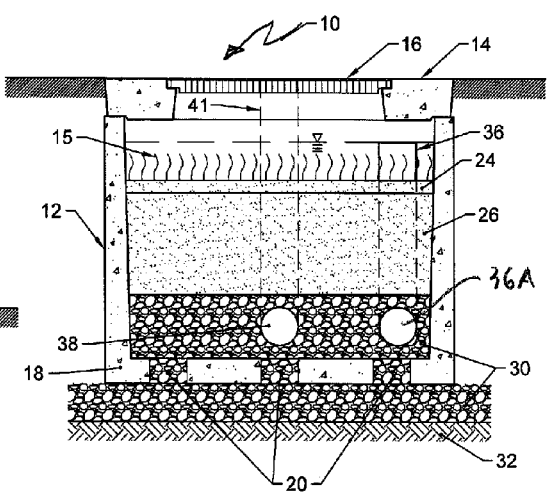

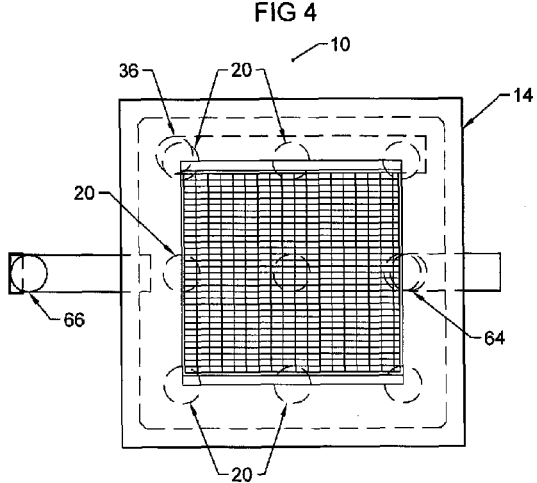
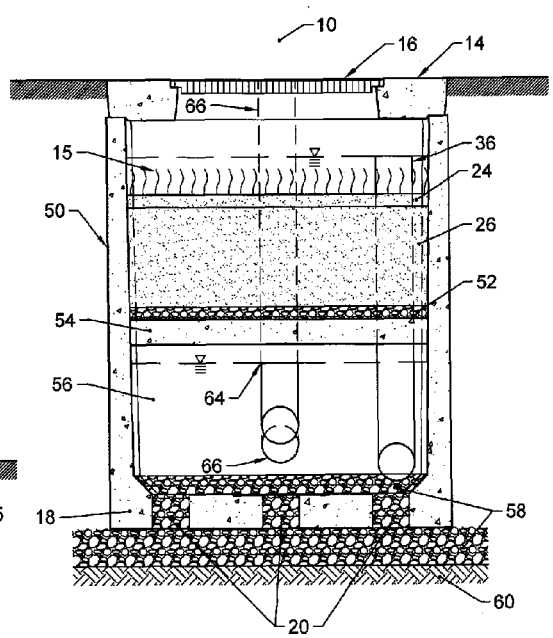
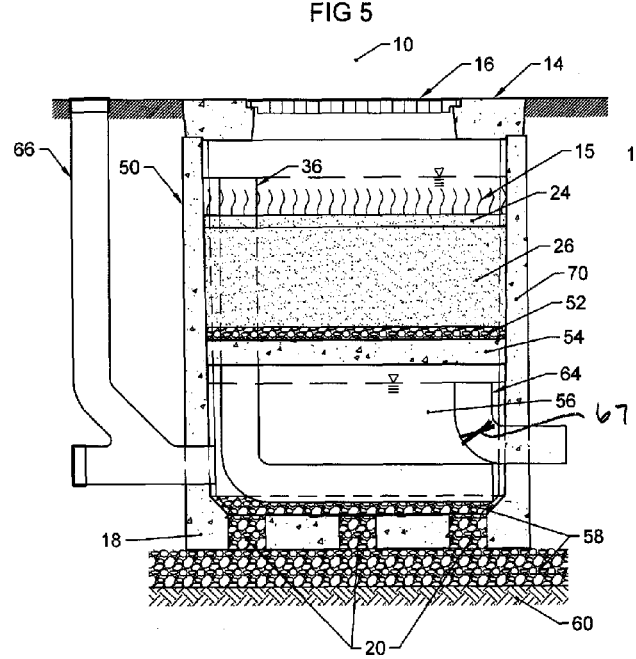

BIORETENTION BOX

This is a non-provisional application claiming the priority of provisional application No. 61/341,676, filed Apr. 5, 2010.

TECHNICAL FIELD

This invention relates generally to bioretention cells which are designed to remove sediment and other material from storm water, and more particularly concerns such a device which can be used in paved areas.

BACKGROUND OF THE INVENTION

Bioretention cells include treatment media to remove sediment, debris, chemical pollutants and other contaminants from storm water runoff. Many bioretention cells allow for surface ponding of storm water prior to treatment and include a storage area, usually comprised of washed rock, to detain treated storm water prior to its infiltration into the ground. Hence, a bioretention cell usually serves two purposes: (1) treating storm water runoff for general water quality purposes and (2) allowing the treated runoff to infiltrate into the ground, which reduces runoff rates and total volume of storm water.

While bioretention cells have been installed in a wide variety of landscape applications, typically they must be installed in an area which is not traversed by vehicular or pedestrian traffic. They are not used, for instance, in areas of large, continuous expanses of drivable surfaces, such as parking lots, etc. The task of retrofitting bioretention cells into existing parking lots is also a challenge, because low points in the parking lots are often located with catch basins in the center of paved areas, away from landscaping, which is necessary for effective operation of conventional bioretention cells. Extensive pavement replacement, changes to storm drain arrangements and regrading are often necessary to direct runoff to bioretention cells which are positioned in adjacent landscaped areas.

DISCLOSURE OF THE INVENTION

Accordingly, the bioretention box, for installation in a subgrade soil region, comprises: a vault member; a removable lid for the vault member; a grate positioned in and supported by the lid, wherein the lid, the grate and the vault are capable of supporting vehicular traffic so that the bioretention box may be positioned in a parking lot subgrade, the grate being at grade level; a region of treatment material, for storm water coming into the vault through the grate, positioned within the vault; and an outlet for treated water which has moved through the treatment region out from the vault to either the subgrade in which the bioretention box is installed or to an exterior storm drain.

BRIEF DESCRIPTION OF THE DRAWINGS

FIG. 1 is a top view of one embodiment of the present bioretention box.

FIGS. 2 and 3 are orthogonal cross-sectional views of one embodiment of the bioretention box.

FIG. 4 is a top view of a second embodiment of the bioretention box.

FIGS. 5 and 6 are orthogonal cross-sectional diagrams of the second embodiment.

BEST MODE FOR CARRYING OUT THE INVENTION

FIGS. 1-3 show the first embodiment of a bioretention box, referred to generally at 10. The box 10 includes a vault member 12 which typically comprises reinforced concrete. The vault 10 could also comprise other composite materials, including metal. The vault 10 contains treatment elements of a bioretention cell and other structural elements, as described below. The size of the vault can vary significantly, depending upon the application. A typical size, for a small application might be four feet square by four feet deep. A typical size for a larger application might be twelve feet long by six feet wide by six feet deep. Typically, the vault walls are approximately 4-6 inches thick. Positioned on the top edge of the vault is a lid 14 which supports a center grate 16. Typically, grate 16 for the vault sizes noted above will be three feet square, with the lid and grate able to support vehicular as well as pedestrian traffic. The grate can be configured to allow pedestrian traffic as well. Grate 16, for instance, is typically made of steel, and with the vault and lid is capable of supporting vehicular traffic. Lid 14 is also typically made of concrete.

The bottom 18 of the vault 12 typically will include open regions which can vary in size and spacing. In the embodiment shown, there are nine equally spaced open regions 20, each opening being circular, approximately six inches in diameter.

In the embodiment of FIGS. 1-3, referring now specifically to FIGS. 2 and 3, contained within vault 12 is the treatment region, the elements of a typical bioretention cell, including an upper layer of plants 15. The plants can vary, and they help to maintain the soil system in the vault, as explained below, as well as removing pollutants from storm water runoff through phytoremediation involving extraction, stabilization and transformation. Examples of suitable plants are sedges and sedums, although many and various other plants can be used.

Positioned below the plant material layer 15 in the bioretention box is a mulch layer 24. Mulch layer 24 is typically shredded or chipped bark or wood and is relatively thin, approximately two-three inches in the embodiment shown. Mulch layer 24 is effective in capturing metals and hydrocarbons as the storm water passes through the bark/wood.

Positioned below mulch layer 24 is a soil-based treatment layer 26. In the embodiment shown, treatment layer 26 is an approximately 60/40 mix of sand and compost, respectively, although this can be varied as well. Typically, the depth of the treatment layer will be approximately eighteen to twenty-four inches. Various soil additions, such as bone meal, can be included in the treatment layer to accomplish specific treatment goals, such as the removal of certain specific metals.

Positioned below treatment layer 26 and extending to the bottom 18 of the vault 10 is a mixture layer of washed rocks 30 which can vary in size. The washed rock layer 30 extends downwardly to the bottom 18 of the vault, through open regions 20, and then below the bottom of the vault, typically for a distance of approximately six to twelve inches. Below the washed rock 30 is subgrade 32.

Positioned within vault 12 is an overflow riser 36, which in the embodiment shown is a pipe which extends from slightly above the level of plant layer 15, down through layers 24 and 26 to near the bottom of the vault, within washed rock layer 30. Typically, overflow riser 36 is secured to one side wall 37 of the vault, extending downwardly through the vault until it connects to a perforated pipe 36A to disperse untreated storm water into washed rock 30.

In addition, the embodiment of FIGS. 1-3 includes a perforated underdrain pipe 38 positioned within washed rock 30 near the bottom of the vault. Underdrain pipe 38 extends through side wall 39, connecting to a downstream storm drain, represented at 38A. When underdrain pipe 38 becomes clogged with fines, a jet of air or water can be used at a cleanout line 41 which connects with underdrain pipe 38 to clean out underdrain pipe 38. Storm drain pipes from upstream structures, whether new or existing, can be connected to underdrain pipe 38 in the washed rock layer 30, with the bioretention box 10 thus functioning as a junction structure.

Vault 12 can be easily positioned in an excavated region and positioned such that the lid and the grate are even with a parking surface, pedestrian surface or a landscaped area. The arrangement is such that the bioretention box can conveniently support vehicle and pedestrian traffic.

In operation, polluted storm water enters bioretention box 10 through grate 16, where it then infiltrates through the plant layer, the mulch layer and into the treatment layer. The sediment, debris, metals and chemical pollutants are primarily captured by the mulch layer and the treatment layer, including chemical compounds, hydrocarbons, e.g. oil and gas, various metals, washed debris and other solids. The treated storm water then moves through the washed rock 30 and down through openings 20, rock layer 30 and then into the native subgrade 32.

If storm water flow exceeds the infiltration capacity of the treatment layer 26, it is allowed to accumulate within the box to a depth established by the upper edge of the overflow riser 36, typically six to twelve inches. High flows thus bypass the treatment layers and are dispersed directly in rock layer 36 through the overflow riser. If flows exceed the infiltration capacity of the subgrade, the excess water is carried off through the perforated underdrain pipe 38 then out to the storm area. Hence, the bioretention box shown has the capability of accommodating high flows from large storm events which exceed the ability of the treatment layers to accommodate the flow, as well as the ability to handle flows which exceed the infiltration capacity of the subgrade.

In one modification of the embodiment of FIGS. 1-3, the bottom of the vault can be made solid, which results in all of the treated water being evacuated to the storm drain instead of to the subgrade. This is in case the particular subgrade cannot accommodate any water due to a high water table, very poor infiltration characteristics, contaminated soil or other conditions.

FIGS. 4-6 show a second embodiment of the bioretention box. In FIGS. 4-6, the bioretention vault 50 is deeper than vault 12 in the embodiment of FIGS. 1-3 but otherwise is the same for the dimensions and arrangement of the lid and grate, the plant and ponding area, the overflow riser, the mulch layer and the soil treatment layer. Those members/layers thus have the same numerals in FIGS. 4-6 as for the embodiment of FIGS. 1-3.

In the embodiment of FIGS. 4-6, below treatment layer 26 is a thin layer of washed rock 52, which is in the embodiment shown approximately two inches thick, and a perforated shelf 54 of reinforced concrete or similar structural material. Below shelf 54 is a retention chamber 56 which in the embodiment shown is approximately eighteen to twenty-four inches high. Below retention chamber 56 is a layer of washed rock 58, leading to the subgrade 60.

The embodiment of FIGS. 4-6 includes a second overflow pipe 64, within the retention chamber, which extends through side wall 70 of vault 50, typically then connecting to a storm drain, shown in FIGS. 1-3. The overflow pipe 64 is positioned within the retention chamber with an upper edge near the top of the retention chamber, thus providing a direct outlet for excess storm water. Otherwise, storm water in the retention chamber moves down through the washed rock layer 58, infiltrating into subgrade 60. The retention chamber 56 provides the capability of temporarily storing peak runoff of storm water and provides an increased ability to permit infiltration of storm water into the subgrade over time. It is possible to incorporate a flow control device such as an orifice or notched weir 67 in overflow riser 64 to release detained storm water in a controlled fashion to the storm drain.

The embodiment of FIGS. 4-6 also includes a cleanout port and line 66 that provides access to retention chamber 56. A jet of air or water can be used with a vacuum hose to clear accumulated sediments and debris from the retention chamber 56.

The above systems are easily maintained by removing the grate and possibly the lid and replacing the mulch layer. The soil treatment layer can also be replaced, but this layer usually has a long life, up to 20-25 years or so.

Hence, a bioretention box has been described which is particularly configured and adapted to be positioned into selected areas where there is vehicular and/or as pedestrian traffic, such as parking lots or other paved areas. The system is designed and configured to provide adequate support for such traffic as well as providing the desired treatment capability for storm water. The box, however, is also suitable for traditional landscape areas. The bioretention box has the capability of treating storm water flows, with the treated water being directed toward the subgrade without damage to the native soil. High flows can be directed to a storm drain system after treatment, or in some cases, excess storm runoff can be directed to the storm drains prior to treatment. Further, in one embodiment, a portion of the bioretention box can be used to temporarily store overflow, as storm water gradually infiltrates the subgrade.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A bioretention box, for installation in a subgrade soil region, comprising:
   a vault member;
   a removable lid for the vault member;
   a grate positioned in and supported by the lid, wherein the lid, the grate and the vault are capable of supporting vehicular traffic so that the bioretention box is positionable in a parking lot subgrade, the grate being at grade level;
   a region of treatment material, for storm water coming into the vault through the grate, positioned within the vault;
   an outlet for treated water which has moved through the treatment region out from the vault to either the subgrade in which the bioretention box is installed or to an exterior storm drain;
   wherein the vault has a bottom portion with openings therein to which treated storm water from the treatment region can move into the subgrade;
   a layer of washed rock at the bottom of the vault, extending into the openings in the bottom of the vault between the bottom of the vault and the subgrade;
   a riser/overflow pipe which extends vertically from a position in the vicinity of an upper surface of the treatment region to approximately the bottom portion of the vault and then connects to a perforated pipe which is positioned in the washed rock at the bottom of the vault, allowing storm water overflow to move into the subgrade; and a horizontal perforated drain pipe positioned below a lower surface of the treatment region, wherein in operation treated storm water moves into the perforated drain pipe and then out through a side wall of the vault to an exterior storm drain.

2. The bioretention box of claim 1, wherein the treatment region includes a soil media layer and a mulch layer above the soil media layer.

3. The bioretention box of claim 2, wherein the mulch layer comprises shredded or chipped bark or wood and the soil media layer comprises a mix of sand and compost.

4. The bioretention box of claim 3, including plantings positioned on top of the mulch layer.

5. The bioretention box of claim 1, wherein the grate is removable so that the treatment region can be at least partially removed and replaced.

6. The bioretention box of claim 1, including a cleanout tube which extends from a surface to the perforated drain pipe, for cleaning out fines in the perforated drain pipe, by pressurized air or liquid.

7. A bioretention box, for installation in a subgrade soil region, comprising:

a vault member;

a removable lid for the vault member;

a grate positioned in and supported by the lid, wherein the lid, the grate and the vault are capable of supporting vehicular traffic, so that the bioretention box is positionable in a parking lot subgrade, the grate being at grade level;

a region of treatment material, for storm water coming into the vault through the grate positioned within the vault;

an outlet for treated water which has moved through the treatment region out from the vault to either the subgrade in which the bioretention box is installed or to an exterior storm drain;

a retention chamber between a lower surface of the treatment region and the bottom of the vault;

a first overflow pipe which extends from above the treatment region down through the treatment region to the lower end of the retention box and then connects to a perforated pipe which disperses excess storm water in the retention chamber; and a second overflow pipe which extends from near an upper end of the retention chamber down to a lower end thereof and out through a side wall of the vault to an exterior storm drain.

* * * * *